Sept. 10, 1968     A. L. THOMPSON     3,400,805
BELT-TYPE AUTOMATIC BUNK FEEDER
Filed May 16, 1966     4 Sheets-Sheet 1
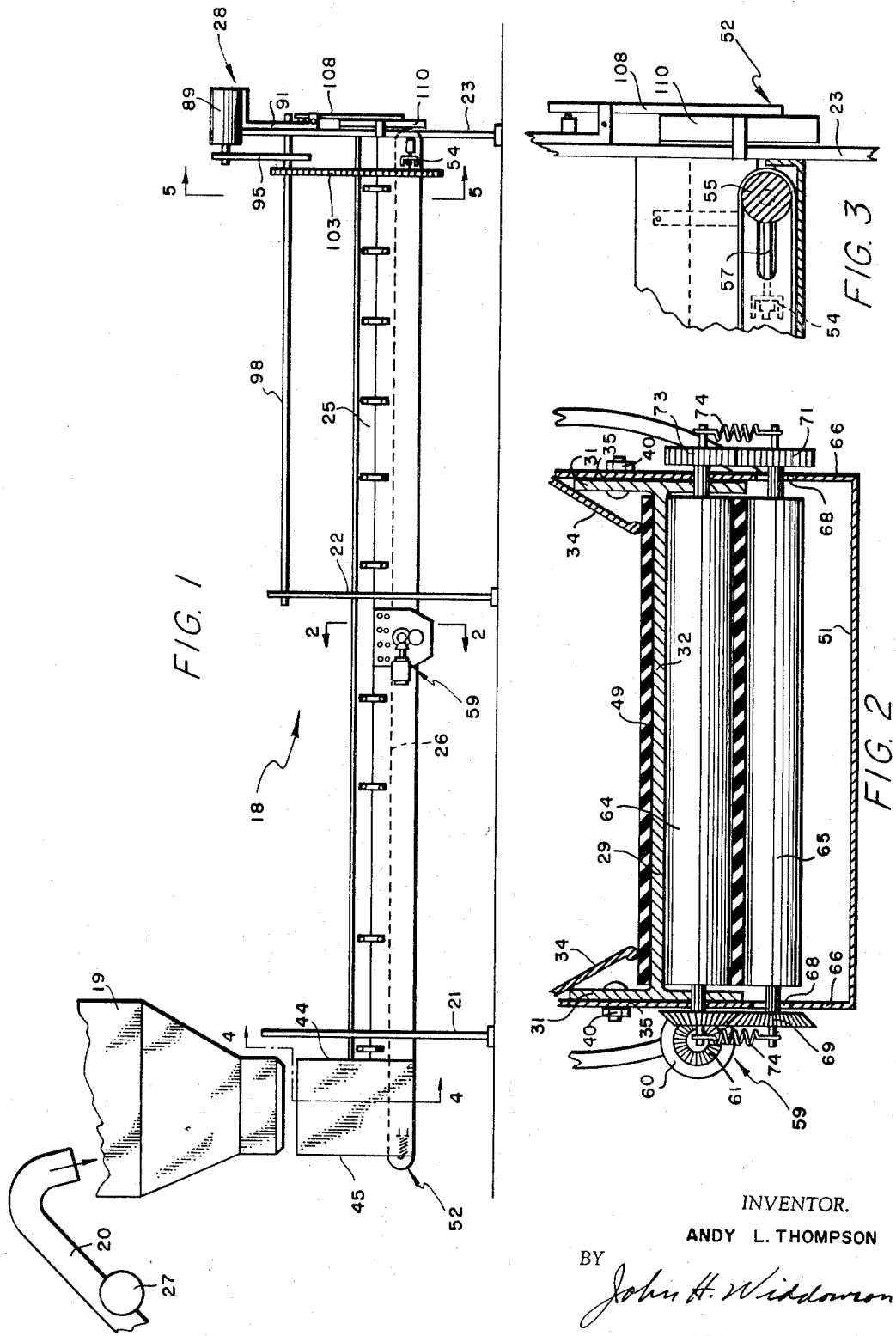
INVENTOR.
ANDY L. THOMPSON
BY John H. Widdowson
ATTORNEY INVENTOR.
ANDY L. THOMPSON
BY
*John H. Widdowson*
ATTORNEY Sept. 10, 1968  A. L. THOMPSON  3,400,805
BELT-TYPE AUTOMATIC BUNK FEEDER
Filed May 16, 1966  4 Sheets-Sheet 3

INVENTOR.
ANDY L. THOMPSON
BY
John H. Widdowson
ATTORNEY

Sept. 10, 1968  A. L. THOMPSON  3,400,805
BELT-TYPE AUTOMATIC BUNK FEEDER

Filed May 16, 1966  4 Sheets-Sheet 4

INVENTOR.
ANDY L. THOMPSON
BY
John H. Widdowson
ATTORNEY

United States Patent Office 3,400,805
Patented Sept. 10, 1968

3,400,805
BELT-TYPE AUTOMATIC BUNK FEEDER
Andy L. Thompson, R.R. 2, Courtland, Kans. 66939
Filed May 16, 1966, Ser. No. 550,292
4 Claims. (Cl. 198—56)

ABSTRACT OF THE DISCLOSURE

This invention relates to an apparatus for conveying and distributing forage and the like to stock animals, and more particularly, to a conveyor type apparatus operable to carry forage from a supply hopper to the feeding area of livestock. Still, more specifically, this invention relates to an apparatus having an endless belt-type conveyor structure used to convey a desired amount of forage to a stock feeding area and means for rotating the conveyor to discharge the forage in the proper location. Finally, more particularly, the invention relates to a rotatable belt-type feed conveyor and interconnected container means having means for controlling the direction and interval of rotation and the stop position after the rotation. Also, the invention relates to a control means having a feed actuated switch means operable to rotate an interconnected endless belt-type feed conveyor and container means and controlling the direction and amount of rotation to the inverted position for the automatic dumping of feed contained thereon.

---

In our mechanized age with the high cost and scarcity of farm labor, it is imperative that the successful farms of today handle a large number of livestock with a minimum amount of human effort. Therefore, numerous types of feed conveyor apparatus have been devised which provide auger conveyors to move forage or feed through a housing to a livestock feeding area. The forage is discharged from the conveyor apparatus in the proper location by rotation of the housing or through holes contained therein. The conveyance of forage, having various density components, has a tendency to separate during this longitudinal movement by the auger conveyors so as to discharge an inconsistent mixture not having the proper growth ingredients along the entire length of the conveyor apparatus. Additionally, the prior art auger conveyors transfer a variable amount of forage along its length, and, therefore, it is impossible to discharge an even amount or be able to ascertain when the conveyor is completely filled so as to discharge forage at the proper time.

In preferred specific embodiments of the invention, an apparatus is provided for conveying and discharging forage or the like having an elongated container, a conveyor mounted on the container, a main support frame, means for rotatably connecting the container to the support frame, and a motor secured to the main frame and operably connected to the container for movement thereof through an inverted position to discharge the forage from the conveyor. The conveyor has an elongated endless belt member mounted about a support beam of the container extending the length thereof, and the conveyor operable to convey forage from a supply hopper longitudinally of the support beam. The support beam is of an I-shape transverse cross section having a horizontal base section which vertically supports the upper section of the belt member and any forage load carried thereon. A belt drive secured to the support frame has a pair of rollers in frictional engagement with opposite sides of the lower section of the belt member whereby the rollers are driven to oscillate the belt member about the support beam. The motor assembly includes a motor connected by a belt member and a chain member to a ring member secured to the support beam and mounted thereabout. The motor is operable to rotate the ring member and connected conveyor about a common axis. Adjacent one end of the conveyor is a supply hopper operable to discharge forage onto the belt member for movement to the other end of the support beam. On filling the belt member along its length with a supply of forage, the motor is activated to rotate the container and the conveyor about the common axis to discharge the forage therefrom. A control can conveniently be used to automatically rotate the conveyor when it achieves the aforementioned filled condition.

Accordingly, it is an object of this invention to provide a new and novel bunk-type feeder apparatus.

Another object of this invention is to provide a feeder apparatus having an endless belt conveyor means to carry forage to a livestock feeding area.

Still another object of this invention is to provide a feeder apparatus having a conveyor means connected to a container means, both of which are rotatable about a common axis to discharge forage carried thereon.

One other object of this invention is to provide a feeder apparatus having an endless belt conveyor to carry forage the entire length thereof and means operable to simultaneously discharge the entire forage carried thereupon.

One further object of this invention is to provide a feeder apparatus having a conveyor means rotatable to discharge forage carried thereon and control means operable to selectively rotate the conveyor means in either direction or to an inverted, inactive position.

Still one object of this invention is to provide a feeder apparatus that is economical to manufacture, simple to operate, inexpensive to use, and rigid in construction.

Various other objects, advantages and features of the invention will become apparent to those skilled in the art from the following discussion, taken in conjunction with the accompanying drawings, in which:

FIG. 1 is an elevational view of the feeder apparatus of this invention illustrated in conjunction with a material supply hopper shown in a fragmentary view;

FIG. 2 is an enlarged fragmentary sectional view taken along the line 2—2 in FIG. 1;

FIG. 3 is an enlarged fragmentary elevational end view of the feeder apparatus of this invention illustrating a belt tensioning means;

Figure 4:
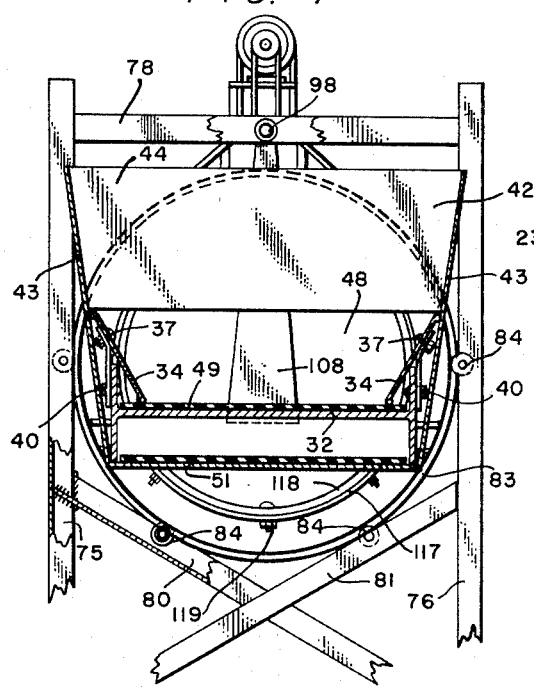
FIG. 4 is an enlarged fragmentary sectional view taken along the line 4—4 in FIG. 1 illustrating only the feeder apparatus of this invention.

The following is a discussion and description of preferred specific embodiments of the new automatic bunk-type feeder apparatus of this invention, such being made with references to the drawings, whereupon the same reference numerals are used to indicate the same or similar parts and/or structure. It is to be understood that such discussion and description is not to unduly limit the scope of the invention.

Referring now to the drawings in detail, and in particular to FIG. 1, a feeder apparatus of this invention is indicated generally at 18 associated with a supply hopper 19 used to discharge forage and the like on one end of the feeder apparatus 18 for conveyance into a livestock feeding area. The feeder apparatus 18 includes a plurality of spaced substantially identical support frames 21, 22, and 23 vertically supporting an elongated container means 25, a conveyor means 26 connected to the container means 25, and a motor means 28 secured between the pair of support frames 22 and 23 and operably connected to the container means 25 and the conveyor means 26 for conjoint rotation thereof. A feed blower 20 having a motor 27 is operable to feed forage into the supply hopper 19.

As shown in FIGS. 2 and 4, the container means 25 has an elongated support beam 29 of I-shape in transverse cross-section having vertically extended end sections 31 integral with a base section 32. A pair of downwardly converging sidewall extensions 34 are secured as by brackets 35 to inner opposite upper portions of the end sections 3 (FIG. 4). The brackets 35 are of an angular shape having upper ends secured as by bolts 37 extended through elongated slots 38 in the sidewall extensions 34 and the lower ends by bolts 40 secured to the end sections 31. The bolt and slot connection permits vertical adjustment of the sidewall extensions 34 for reasons to become obvious. As shown in FIG. 1, it is obvious that any number of spaced brackets 35 may be used to provide sufficient rigidity to the sidewall extensions 34 as deemed necessary. Additionally, it is seen that the support beam 29 and the sidewall extensions 34 cooperate to form a trough-like retainer means adapted to support forage and the like therewithin.

Adjacent the inlet or supply end of the container means 25 is a directional boot member 42 secured as by welding to the upper and lower edges of the sidewall extensions 34 and the support beam 29, respectively (FIG. 4). The boot member 42 has downwardly converging sidewalls 43 interconnected by front and rear walls 44 and 46, respectively, to direct forage from the supply hopper 19 for conveyance forwardly, by the conveyor means 26 through an opening 48 in the front wall 44.

In order to convey forage from the supply end of the container means 25, the conveyor means 26 is operably connected to the support beam 29 and includes a belt member 49 mounted about and extended the length of the base section 32 of the support beam 29. The upper section of the belt member 49 and any forage carried thereupon is vertically supported on the base section 32. As shown in FIG. 2, the lower end of the sidewall extensions 34 abuts the upper section of the belt member 49 to hold the same in contact with the base section 32 and prevent forage from working into a position therebetween. An elongated cover pan 51 is secured as by welding to the lower end sections 31 and extended therebetween to protect the conveyor means 26 from the weather as will become obvious. The belt member 49 is held under longitudinal tension by belt tightening means 52 connected to opposite ends of the support beam.

As shown in FIG. 3, each of the belt tightening means 52 includes channel members 54 welded to opposed outer surfaces of the lower portions of the end sections 31 of the support beam 29 and extended outwardly therefrom. A roller member 55 is adjustably connected to the channel members 54 by a pair of spaced parallel rod members 57 rotatably connected to opposite ends of the roller member 55. The roller members 55 are movable axially of the support beam 29 with the rod members 57 mounted in holes in the channel members 54 and secured thereto in the desired position by nuts so as to selectively adjust the tension of the belt member 49 which extends about outer surface the roller members 55.

The conveyor means 26, as shown in FIG. 2, further includes a drive means 59 having a motor 60 secured to the outer of surface of one of the end sections 31 operable through bevel gears 61 and 62 to drive a pair of rollers 64 and 65 having the lower section of the belt member 49 sandwiched therebetween. The roller 64 has opposite ends rotatably mounted in the lower portion of the opposed end sections 31. A pair of parallel downwardly depending extension plates 66 are secured to the end sections 31 and cooperate to support opposite ends of the roller 65 within slots 68 to restrict horizontal movement thereof. The pan 51 extends between the extension plates 66 to protect the drive means 59 from the weather. The motor 60 has a shaft connected to the bevel gear 61 which in turn is in driving engagement with the bevel gear 62 secured to one outer end of the roller 64. The roller 65 has a bevel gear 69 at one end in engagement with the bevel gear 62 and a gear 71 at the opposite end in mating engagement with a similar gear 73 secured to the upper roller 64. The belt member 49 is mounted under compression between the parallel rollers 64 and 65 by tension springs 74 secured to corresponding opposite adjacent roller ends. It is seen that the opposite ends of the roller 65 are mounted within the vertically extended slots 68 in the extension plates 66 whereby the roller is vertically movable under spring tension into engagement with the belt member 49 and positively driven by the loosely mating gears 62, 69, 71 and 73. It is obvious that energization of the motor 60 is operable to frictionally drive the belt member 49 between the rollers 64 and 65 to oscillate the same about the support beam 29 in a clockwise direction as viewed in FIG. 1. Therefore, the conveyor means 26 is adapted to receive forage from the supply hopper 19 on the inlet end of the container means 25 and carry the same to the opposite end thereof.

The container means 25 and interconnected conveyor means 26 are vertically supported for rotational movement about a horizontal axis by the spaced support frames 21, 22, and 23. As the support frames are substantially identical, the support frame 21 need only be described in detail. As shown in FIG. 4, the support frame 21 is of a channel construction and includes a pair of spaced vertical posts 75 and 76 interconnected at the upper ends by a horizontal brace member 78 and supported intermediate their opposite ends by channel members 80 and 81. The channel members 80 and 81 are welded together in an X-shape with outer adjacent ends welded to the posts 75 and 76, respectively. The container means 25 is mounted within and secured as by welding at the lower outer edges of the support beam 29 to a large ring 83 having the outer peripheral edge rotatably supported by bearing assemblies 84 in the support frame 21. The ring 83 is held against lateral movement by having opposed sides held between the bearing assemblies 84 which are rotatably mounted in the posts 75 and 76. Vertical support of the ring 83 is provided by the bearing assemblies 84 mounted in the channel members 80 and 81.

Figure 6:
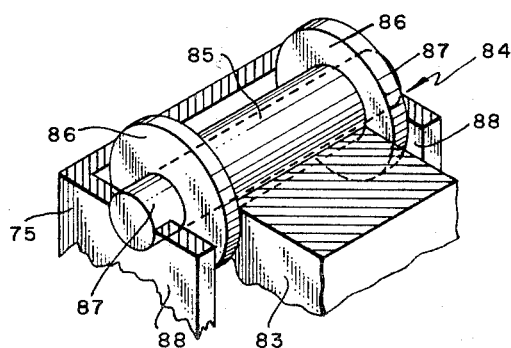
FIG. 6 is an enlarged fragmentary perspective view illustrating the means of rotatably connecting the conveyor means to the main support frame of this invention.

More particularly as shown in FIG. 6, the bearing assembly 84 mounted in the post 75, for example, consists of a spool shaped main body 85 having parallel end walls 86 with stub shafts 87 extended laterally thereof. The stub shafts 87 are rotatably mounted in axially aligned holes in the parallel legs 88 of the post 75. The peripheral edge of the ring 83 rides on the main body 85 between the end walls 86 to provide for lateral support of the ring 83 while permitting rotational movement relative to the support frame in order to rotate the conveyor means 26.

Figure 5:
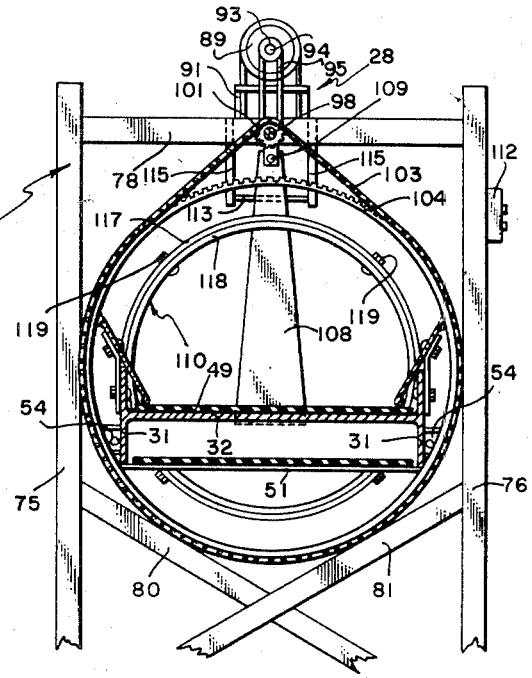
FIG. 5 is an enlarged fragmentary sectional view taken along the line 5—5 in FIG. 1.

As shown in FIGS. 1 and 5, the power for turning the conveyor means 26 is provided by the motor means 28 which includes a motor 89 secured to a bracket 91 mounted on the upper end of the support frame 23. The motor 89 has a drive pulley 93 secured to a shaft 94 and a belt 95 connected between the pulley 93 and a driven pulley 97. The driven pulley 97 is secured to an intermediate or idler shaft 98 having opposite ends rotatably supported by bearings 99 in the brace members 78 of the support frames 22 and 23, respectively. The motor 89 is operable through the driven pulley 97 to rotate the idler shaft 98 and a sprocket member 101 secured thereto. A drive chain member 103 interconnected the sprocket 101 to an enlarged ring gear 104 similar in size to the ring 83 previously described. The vertically extended ring gear 104 is mounted about and secured as by welding to the support beam 29 of the container means 25 and has a plurality of outer tooth members engageable with the chain member 103. It is obvious that the motor 89 is operable to rotate the ring gear 104 about its axis to revolve the conveyor means 26 and the container means 25 through 360 degrees. A control means 107 is used to energize the motor means 28 to automatically discharge the forage carried on the feeder apparatus when it reaches the forward end thereof.

As shown in FIGS. 7–10, the control means 103 includes an actuator lever 108, an indicator switch 109 operably connected to the lever 108, a selector ring assembly 110 engageable with the lever 108, and a switch means 112 operable to selectively energize the motors 27, 60 and 89 to supply actuate, and periodically rotate the conveyor means 26 in either direction. The actuator lever 108 is pivotally mounted on a shaft 113 carried on angle members 115 welded to the brace member 78 of the support frame 23. The lever 108 is positioned wherein the lower end thereof is adjacent and below the discharge end of conveyor means 26 so as to be pivotal counterclockwise, as viewed in FIG. 1, by forage carried thereupon.

The indicator switch 109 is mounted on the brace member 78 and has a plunger 116 actuated by the upper end of the lever 108. The switch 109 is of a three positional type having a first "feed" position, a second "inactive" position, and a third "rotational" position as will be explained. The movement of the switch 109 into the aforementioned positions is controlled by the selector ring assembly 110.

Figure 7:
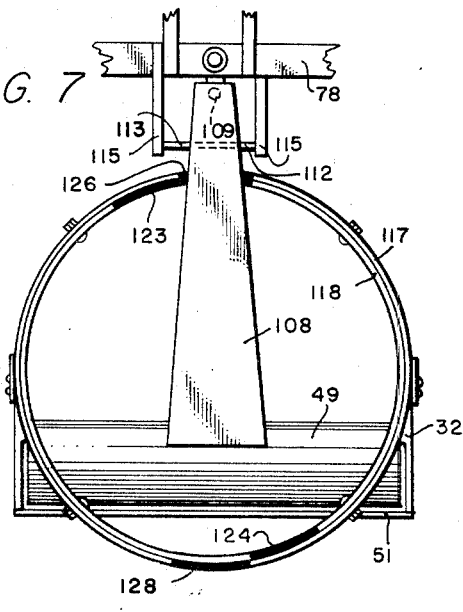
FIG. 7 is a fragmentary elevational view illustrating the control means of this invention.
Figure 8:
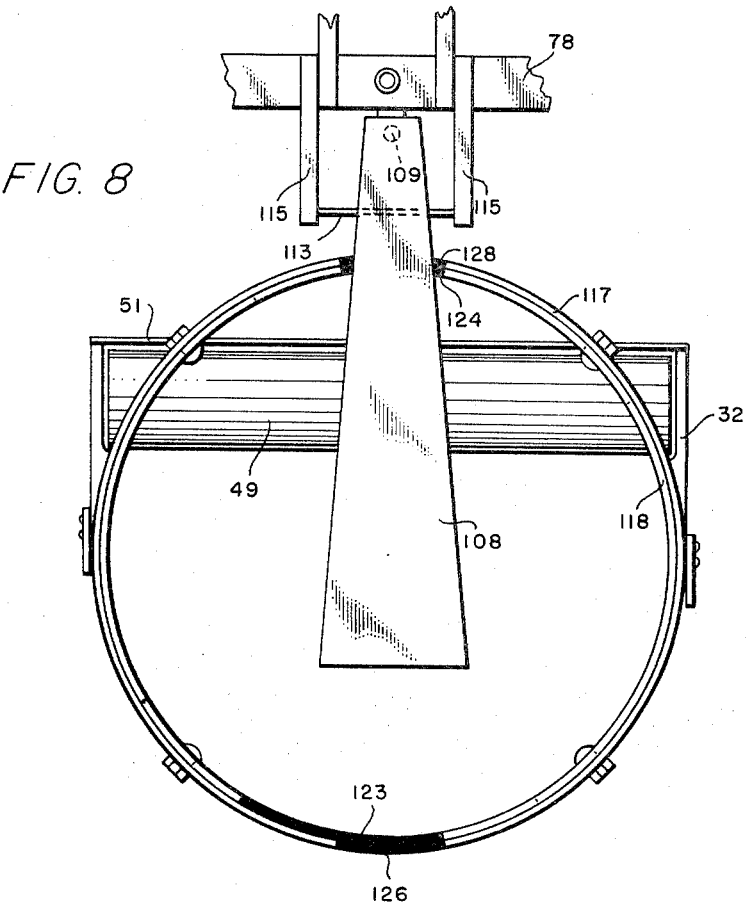
FIG. 8 is a view similar to FIG. 7 illustrating the conveyor means in an inverted position.
Figure 9:
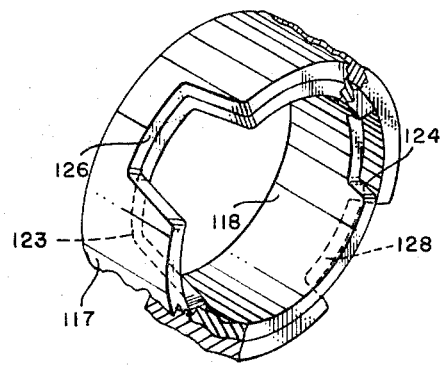
FIG. 9 is a schematic perspective view of an actuator ring of the control means of this invention.

As shown in FIGS. 8 and 9, the selector ring assembly 110 consists of a stationary outer ring 117 secured to the container means 25 and a rotatable inner ring 118 in nesting engagement with the outer ring 117. A plurality of circumferentially spaced bolts 119 extended through outer ring 117 into slot 121 on the inner ring permit relative rotational movement of the rings to a selected position. The inner ring 118 has a first or starting key way 123 and a diametrically opposed key way 124 of substantially half the width and depth of the first key way. The outer ring 117 has a similar starting key way 126 of the same depth but half the width of the key way 123. Diametrically opposite the starting key way 126 is another key way 128 identical to the key way 124 in the inner ring. The minimum width of all the key ways is sufficient to receive the actuator lever 108 for pivotal movement about the shaft 113. The inner ring 118 is rotatable from a continuous operating position of FIG. 7 with the key ways 124 and 128 out of alignment to a storage position of FIG. 8 with the same key ways in alignment. It is to be noted that the difference in depth of the key ways 123, 126 and 124, 128 results in the three possible positions of the actuator lever 108 to correspondingly move the plunger 116 of the indicator switch 109, namely within the key ways 123, 126, the key ways 124, 128, or against the peripheral surfaces of the inner and outer rings.

Figure 10:
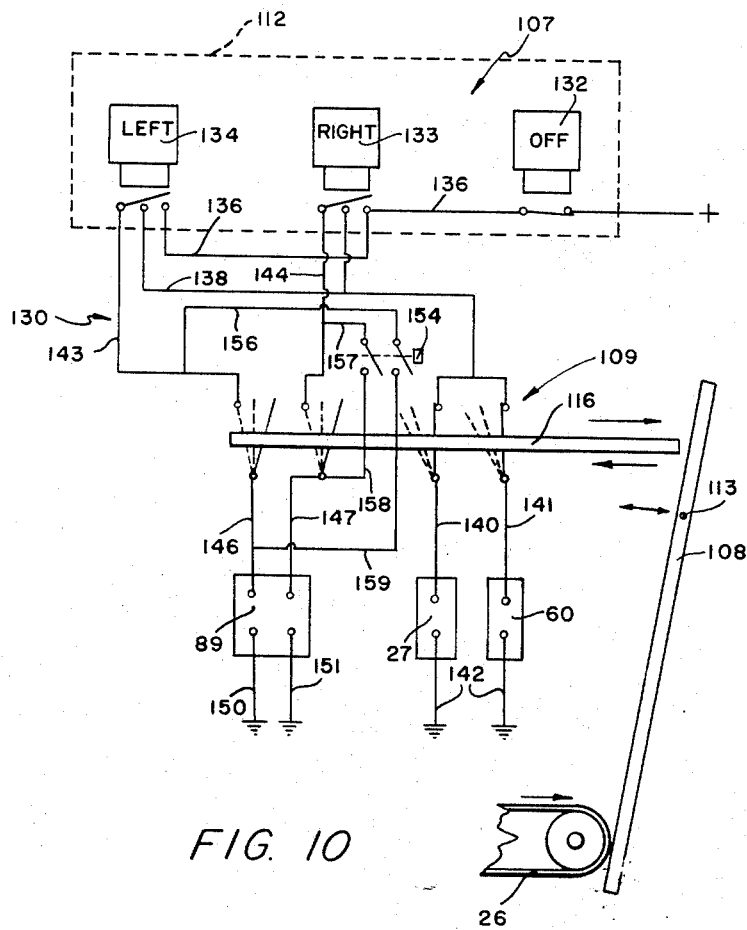
FIG. 10 is an electrical schematic of the feeder apparatus of this invention.

As shown in FIG. 10, the control means 107 further includes an electrical circuit 130 with the switch means 112 having an "on-off" button 132, a rotate "right" button 133, and a rotate "left" button 134. The buttons are connected to a common power supply line 136 through the "off" button 132 to a power source. The "left" and "right" buttons 134 and 133 are connected by a line 138 to the indicator switch 109 and through lines 140 and 141 to the motors 27 and 60 and ground lines 124 to, respectively, supply forage to the conveyors means 26, and oscillate the belt member 49. Additionally, the "left" and "right" buttons 134 and 133 are connected to the indicator switch 109 by lines 143 and 144, respectively, and by lines 146 and 147 to the motor 89 to rotate the conveyor means 26. The motor 89 is connected to ground by lines 150 and 151 to complete the circuit.

Figure 11:
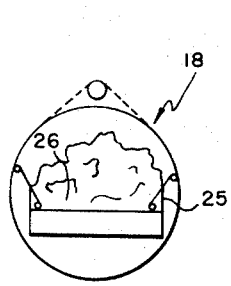
FIGS. 11, 12 and 13 are schematic diagrams illustrating the feeder apparatus of this invention in various stages of rotational feed discharge movement and in the storage position.
Figure 12:
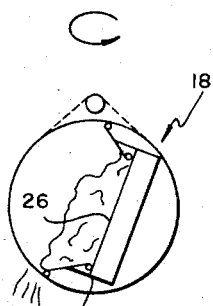
Figure 13:
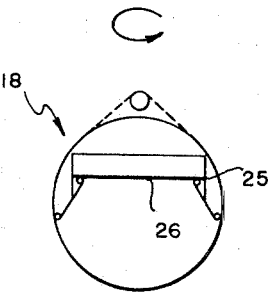

In the use and operation of the feeder apparatus 18, forage is continuously fed from the supply hopper 19 through the boot member 42 to the adjacent end of the belt member 49. The drive means 59 is operable to oscillate the belt member 49 about the support beam 29 and carry the incoming forage towards the forward end of the conveyor means 26. The flow of forage from the supply hopper 19 and the speed of the belt member 49 may be correlated to achieve an even and predetermined amount of desired forage along the entire length of the belt member 49. After the belt member 49 is completely filled, the motor 89 is energized by the control means 107 to rotate the entire conveyor means 26 and the container means 25, as shown in FIGS. 11 to 13. It is seen that the ring gear 104 is driven 360 degrees to completely invert the conveyor means 26 whereby the forage is discharged under the force of gravity and the container means 25 is returned to the original or starting position of FIG 11. It is obvious that this cycle can be repeated as desired to convey a needed amount of forage to the livestock feeding area.

More specifically, on use of the automatic control means 107 with the rings 117 and 118 in the position as shown in FIG. 7, on actuation, for example, of the "left" button 134, the motors 27 and 60 are energized through lines 136, 138, 140, and 141 to add forage to the supply end of the conveyor means 26 and oscillate the belt member 49. On movement of the forage against the lever 108, the switch 109 is moved to the third or "rotational" position whereupon the motors 27 and 60 are de-energized and the motor 89 is energized to rotate the conveyor means to the "left" to discharge the forage carried thereupon. It is obvious that the indicator switch 109 is held in this position until the rings 117 and 118 and connected conveyor means 26 is rotated 360 degrees and the lever 108 moves within the key ways 123 and 126 to disconnect the motor 89 and re-energize the motors 27 and 60. It is obvious that depression of the "right" button 133 results in similar rotation of the conveyor means 26 in the opposite direction as the lever 108 rides over the key ways 124 and 128 and does not stop rotation until moving into the key ways 123 and 126.

A second "inactive" position is provided whereby the inner ring 118 is rotatable to the "storage" position as shown in FIG. 8. In this position, regardless of whether the "left" or "right" button 134 and 133, respectively, is depressed, the conveyor means 26 rotates substantially 180 degrees whereupon the lever 108 moves into the aligned key ways 124 and 128 to move the indicator switch 109 to the central or "inactive" position. In this position, all motors 27, 60, and 89 are de-energized so as to stop the conveyor means 26 in the inverted position whereby the pan 51 covers the member 49 to protect the conveyor means 26 from the weather. It is obvious that this position is necessary to protect the feeder apparatus 18 and the dual rotational feature is desirable whereby livestock can be fed from either side of the conveyor means 26.

In order to move the feeder apparatus 18 from the inverted position of FIG. 8, a push button 154 is connected by lines 156 and 157 to the "left" and "right" buttons 134 and 133, respectively, and by lines 158 and 159 to the motor 89. Depression of the push button 154 results in energization of motor 89 through the "left" or "right" buttons 134 and 133 to initially start upward rotational movement of the conveyor means 26. On release of the button 154, the control means 107 will take over to stop the conveyor means 26 in the upright position. It is obvious that this additional control push button 154 is necessary to return the feeder apparatus 18 to the upright or starting position.

It is seen that the inner and outer 118 and 117 rings can be adjusted to provide a continuous rotational feeder apparatus 18 actuated on filling of the conveyor means 26 or to a position to stop the conveyor means 26 in the inverted position for weather protection and storage.

Although the invention has been illustrated as a double sectional container structure, it would be obvious to one skilled in the art to extend the feeder apparatus to any desired length. This new and novel structure presents many advantageous features over the prior art devices in that an even supply of forage can be conveyed to each point along the entire length of the feeder apparatus. Additionally, the forage is not rotated and disturbed during its longitudinal movement so as to prevent separation of the component materials contained therein whereby a constant forage mixture is fed to the livestock along the entire length of the conveyor means.

As will be apparent from the foregoing description of the preferred embodiment of the applicant's feeder apparatus, a relatively simple and inexpensive conveyor type feeder means has been provided which is easily connectible to a conventional supply hopper so as to provide for an economical and rapid method of conveying forage to a livestock feeding area. Applicant's construction eliminates a great deal of time consuming and tedious work involved in feeding livestock and results in a considerable labor and monetary savings to the livestock farm owner.

While the invention has been described in connection with preferred specific embodiments thereof, it will be understood that this description is intended to illustrate and not to limit the scope of the invention, which is defined by the following claims.

I claim:
1. An apparatus for conveying and distributing feed and other materials, comprising:
 (a) an elongated container means having upright sidewall sections,
 (b) an endless belt-type conveyor means connected to said container means operable to convey the feed longitudinally thereof and forming a trough-like material retainer with said sidewall sections,
 (c) means for supplying feed to one end of said conveyor means for continuous conveyance to the other end, and
 (d) means for moving said conveyor means and container means to an inverted position to discharge feed therefrom.
  said moving means having a support ring secured to and extended about said container means and a motor means connected to said support ring and said motor means is operable to conjointly rotate said conveyor means and said container about the axis of said support ring.
2. An apparatus as described in claim 1, including:
 (a) a control means having an actuator lever operably connected to the discharge end of said container means, a switch means connected to said actuator lever, said supplying means, said conveyor means, and said moving means, and a ring assembly secured to said container means whereby said actuator lever is moved by the feed at the discharge end to energize said moving means to rotate said conveyor means for discharge of forage therefrom and de-energize said supplying means and said conveyor means.
3. An apparatus as described in claim 1, including:
 (a) a control means having an actuator lever connected to the discharge end of said container means,
 (b) switch means connected to said actuator lever, said supplying means, and said conveyor means, and
 (c) cam means connected to said container means engageable with said actuator lever on movement thereof by the feed at the discharge end of said container means to energize said moving means to rotate said interconnected conveyor means and said container means for discharge of the forage therefrom and de-energize said supply means and said conveyor means.
4. An apparatus for conveying and distributing feed and other materials, comprising:
 (a) an elongated container means having upright sidewall sections,
 (b) an endless belt-type conveyor means connected to said container means operable to convey the feed longitudinally thereof,
 (c) means for supplying feed to one end of said conveyor means for continuous conveyance to the other end,
 (d) means for moving said conveyor means and container means to an inverted position to discharge feed therefrom,
 (e) a control means having an actuator lever operably connected to the discharge end of said container means, a switch means connected to said actuator lever, said supplying means, said conveyor means, and said moving means, and a ring assembly secured to said container means whereby said actuator lever is moved by the feed at the discharge end to energize said moving means to rotate said conveyor means for discharge of forage therefrom and de-energize said supplying means and said conveyor means,
 (f) said ring assembly having a plurality of adjustable cam portions, said cam portions contact said actuator lever to maintain said moving means energized and said supply means and said conveyor means de-energized throughout 180 degrees or 360 degrees of rotation as preselected.

References Cited
UNITED STATES PATENTS

| | | | |
|---|---|---|---|
| 2,623,627 | 12/1952 | Maclennan et al. | 198—33 |
| 3,197,016 | 7/1965 | Jones | 198—64 |
| 3,275,135 | 12/1966 | Niese | 198—185 X |
| 3,169,631 | 2/1965 | Knappe | 198—187 |

EVON C. BLUNK, *Primary Examiner.*

R. J. HICKEY, *Assistant Examiner.*